United States Patent
Hasegawa et al.

(10) Patent No.: US 11,093,758 B2
(45) Date of Patent: Aug. 17, 2021

(54) INFORMATION PROCESSING SYSTEM, METHOD OF INFORMATION PROCESSING, AND PROGRAM

(71) Applicant: TOYOTA JIDOSHA KABUSHIKI KAISHA, Toyota (JP)

(72) Inventors: Hideo Hasegawa, Nagoya (JP); Keiko Kameda, Toyota (JP); Misa Ejiri, Nagoya (JP); Shintaro Naruse, Nisshin (JP); Tadahiro Kashiwai, Nagoya (JP); Naoya Oka, Toyota (JP); Kensuke Koike, Nisshin (JP); Hiroyuki Monji, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 16/595,982

(22) Filed: Oct. 8, 2019

(65) Prior Publication Data
US 2020/0175285 A1    Jun. 4, 2020

(30) Foreign Application Priority Data
Nov. 29, 2018  (JP) .............................. JP2018-224088

(51) Int. Cl.
*G06K 9/00*     (2006.01)
(52) U.S. Cl.
CPC ..... *G06K 9/00791* (2013.01); *G06K 9/00765* (2013.01); *G06K 9/00778* (2013.01)

(58) Field of Classification Search
CPC ........... G06K 9/00791; G06K 9/00798; G06K 9/00744; G06K 9/00362; G06K 9/00778
See application file for complete search history.

(56) References Cited

U.S. PATENT DOCUMENTS

| | | | |
|---|---|---|---|
| 2015/0117790 A1* | 4/2015 | Kamiya ................... | G06K 9/46 382/203 |
| 2016/0109617 A1* | 4/2016 | Hiroi ....................... | G01W 1/00 348/148 |
| 2017/0163938 A1* | 6/2017 | Yajima ..................... | G08G 1/16 |
| 2017/0297201 A1* | 10/2017 | Shionozaki .......... | G05D 1/0094 |
| 2019/0130195 A1* | 5/2019 | Sugaya .................... | G01W 1/14 |
| 2020/0175285 A1* | 6/2020 | Hasegawa .......... | G06K 9/00791 |
| 2020/0252557 A1* | 8/2020 | Tanimori .............. | B60S 1/0452 |

FOREIGN PATENT DOCUMENTS

JP         2016-114495 A       6/2016

\* cited by examiner

*Primary Examiner* — Md K Talukder
(74) *Attorney, Agent, or Firm* — Oblon, McClelland, Maier & Neustadt, L.L.P.

(57) ABSTRACT

An information processing system S includes a server device, and an information processing device communicable with the server device. The information processing device is configured to acquire a plurality of images imaged by an imaging device included in a vehicle, and output to the server device, when detecting a change from a non-rainfall state to a rainfall state, or a change from the rainfall state to the non-rainfall state based on the acquired images, location information regarding the vehicle when the change is detected.

8 Claims, 10 Drawing Sheets

FIG. 3

| IMAGE ID | TIME | LOCATION INFORMATION | NUMBER OF PERSONS | NUMBER OF RAIN GEAR USERS | RAIN GEAR USAGE RATE (%) | PRESENCE OF RAINFALL |
|---|---|---|---|---|---|---|
| R01 | t1 | (X1, Y1) | 3 | 0 | 0 | NO RAINFALL |
| R02 | t2 | (X2, Y2) | 5 | 1 | 20 | NO RAINFALL |
| R03 | t3 | (X3, Y3) | 10 | 2 | 20 | NO RAINFALL |
| R04 | t4 | (X4, Y4) | 3 | 2 | 66.7 | RAINFALL |
| R05 | t5 | (X5, Y5) | 7 | 7 | 100 | RAINFALL |

FIG. 5

| CHANGE NOTICE ID | TIME | LOCATION INFORMATION | RAIN GEAR USAGE RATE (%) |
|---|---|---|---|
| S01 | t4 | (X4, Y4) | 66.7 |
| S02 | t4 | (X11, Y11) | 90 |
| S03 | t4 | (X21, Y21) | 80 |

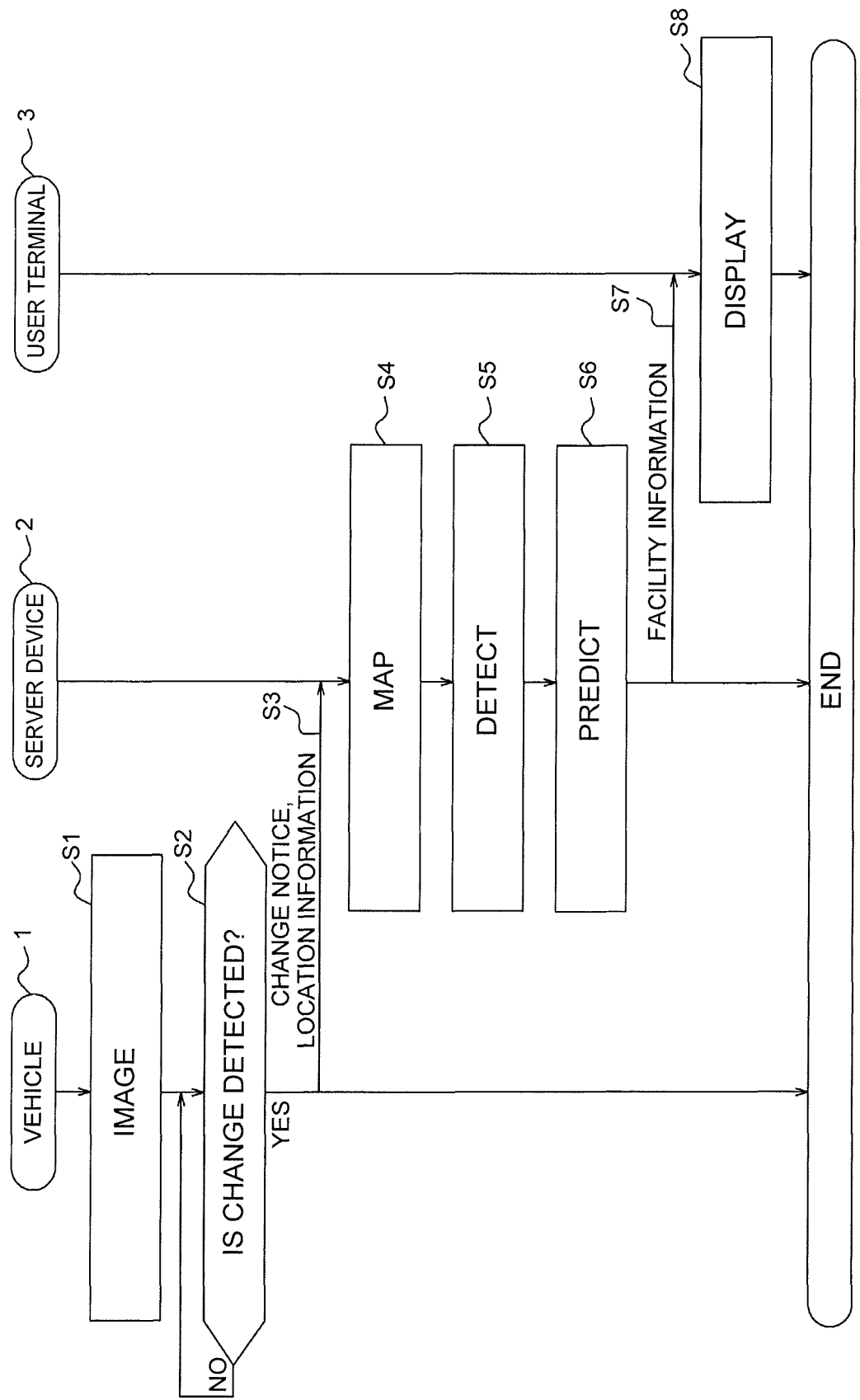

INFORMATION PROCESSING SYSTEM, METHOD OF INFORMATION PROCESSING, AND PROGRAM

INCORPORATION BY REFERENCE

The disclosure of Japanese Patent Application No. 2018-224088 filed on Nov. 29, 2018 including the specification, drawings and abstract is incorporated herein by reference in its entirety.

BACKGROUND

1. Technical Field

The present disclosure relates to an information processing system, a method of information processing, and a program.

2. Description of Related Art

A system has conventionally been known which receives measurements from a large number of installed measuring devices (photovoltaic power generators or wearable terminals that collect vital information), calculates a change rate of the measurements for every area, and compares the change rate with the change rates of the areas surrounding each corresponding area (for example, Japanese Patent Application Publication No. 2016-114495 (JP 2016-114495 A)). Based on the comparison result, the system detects an area that has a rapid environmental change.

SUMMARY

When the system disclosed in JP 2016-114495 A detects a decrease in power generation amount or power generation efficiency measured with the photovoltaic power generators, the system determines a decrease in daylight degree, and predicts localized heavy rainfall. Alternatively, when the system disclosed in JP 2016-114495 detects a change in heart rate, body temperature, or blood pressure measured with the wearable terminals, the system determines that a low pressure develops, and predicts a localized heavy rainfall. However, the system simply predicts the occurrence of a localized heavy rainfall, when a condition, in which the localized heavy rainfall tends to occur, is satisfied. Accordingly, the system is unable to determine whether or not the localized heavy rainfall actually occurs.

In view of the above-stated problem, an object of the present disclosure is to provide an information processing system, a method of information processing, and a program, capable of detecting a change between a rainfall state and a non-rainfall state.

The information processing system according to one embodiment of the present disclosure is an information processing system including: a server device; and an information processing device communicable with the server device. The information processing device is configured to acquire a plurality of images imaged by an imaging device included in a vehicle, and output to the server device, when detecting a change from a non-rainfall state to a rainfall state, or a change from the rainfall state to the non-rainfall state based on the acquired images, location information regarding the vehicle when the change is detected.

A method of information processing according to one embodiment of the present disclosure is a method of information processing executed in an information processing system, including a server device, and an information processing device communicable with the server device, the method including the steps, executed by the information processing device, of: acquiring a plurality of images imaged by an imaging device included in a vehicle; and outputting to the server device, when detecting a change from a non-rainfall state to a rainfall state, or a change from the rainfall state to the non-rainfall state based on the acquired images, location information regarding the vehicle when the change is detected.

A program according to one embodiment of the present disclosure causing an information processing system, including a server device, and an information processing device communicable with the server device, to execute the steps of: acquiring a plurality of images imaged by an imaging device included in a vehicle; and outputting to the server device, when detecting a change from a non-rainfall state to a rainfall state, or a change from the rainfall state to the non-rainfall state based on the acquired images, location information regarding the vehicle when the change is detected.

The information processing system, the method of information processing, and the program of the present disclosure can detect an actual change between the rainfall state and the non-rainfall state.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 shows an example of data that is associated with imaged images;

FIG. 5 shows an example of a change notice;

FIG. 7 is a sequence diagram of a process executed by the information processing system of the embodiment.

DETAILED DESCRIPTION OF EMBODIMENTS

The embodiments of the present disclosure will be described below with reference to the drawings.

Figure 1:
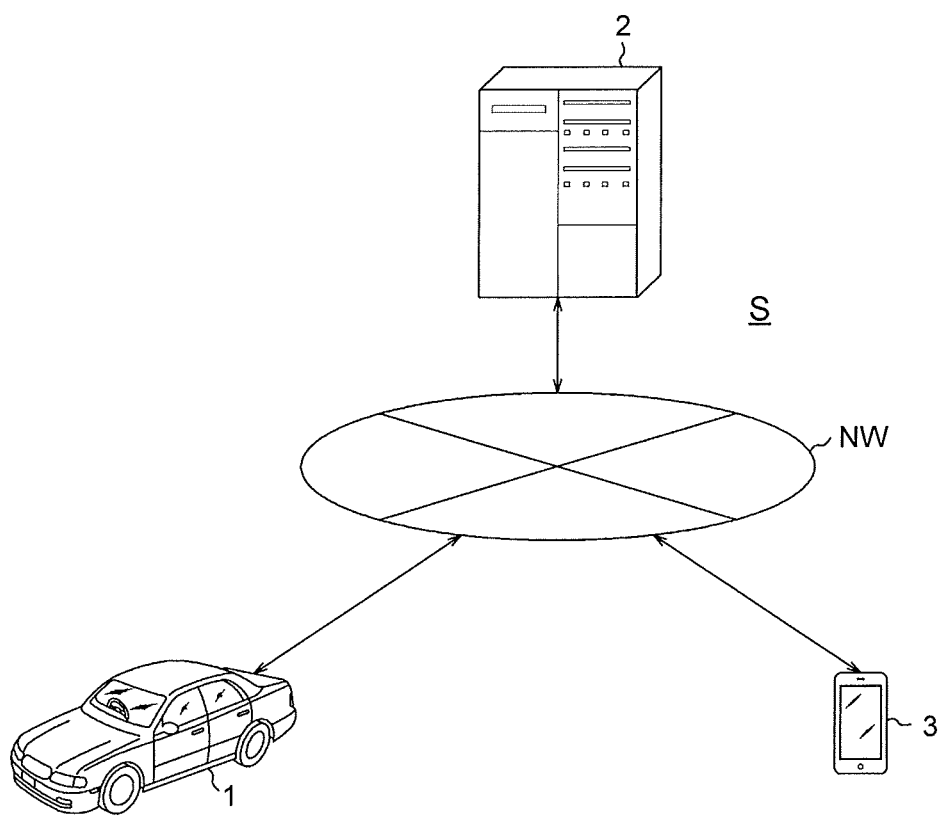
FIG. 1 is an overall view of an information processing system of an embodiment.

FIG. 1 is an overall view of an information processing system S of an embodiment. The information processing system S includes a vehicle 1, a server device 2, and a user terminal 3. Although the vehicle 1 in this embodiment is, for example, an automobile, the vehicle 1 may be any vehicle without being limited to the automobile. In FIG. 1, for the sake of simplified description, one vehicle 1, one server device 2, and one user terminal 3 are illustrated. However, the number of the vehicles 1, the server devices 2, and the user terminals 3 may be one or more. The vehicle 1, the server device 2, and the user terminal 3 are configured to be communicable through a network NW including a mobile communication network, and the Internet, for example.

First, the summary of a process executed by the information processing system S of the embodiment will be described. When the vehicle 1 acquires a plurality of images imaged by an imaging device 11, the vehicle 1 analyzes the images to detect a change from a non-rainfall state to a rainfall state or a change from the rainfall state to the non-rainfall state. For example, when a ratio of the number of rain gear users to the number of persons (for example, pedestrians) detected in the images reaches a prescribed value (for example, 25%), the vehicle 1 determines there is a change from the non-rainfall state to the rainfall state. The vehicle 1 outputs to the server device 2 location information regarding the vehicle 1 when the change is detected. The server device 2 specifies an area with a rainfall by mapping a plurality of location information pieces acquired from the vehicles 1 on a map.

Thus, according to the embodiment, the information processing system S detects, based on the imaged images, what kind of actions (using rain gear in this case) that the persons take for the change from the non-rainfall state to the rainfall state. Hence, the information processing system S can detect an actual change from the non-rainfall state to the rainfall state.

The internal configuration of the vehicle 1, the server device 2, and the user terminal 3 will be described in detail.

Figure 2A:
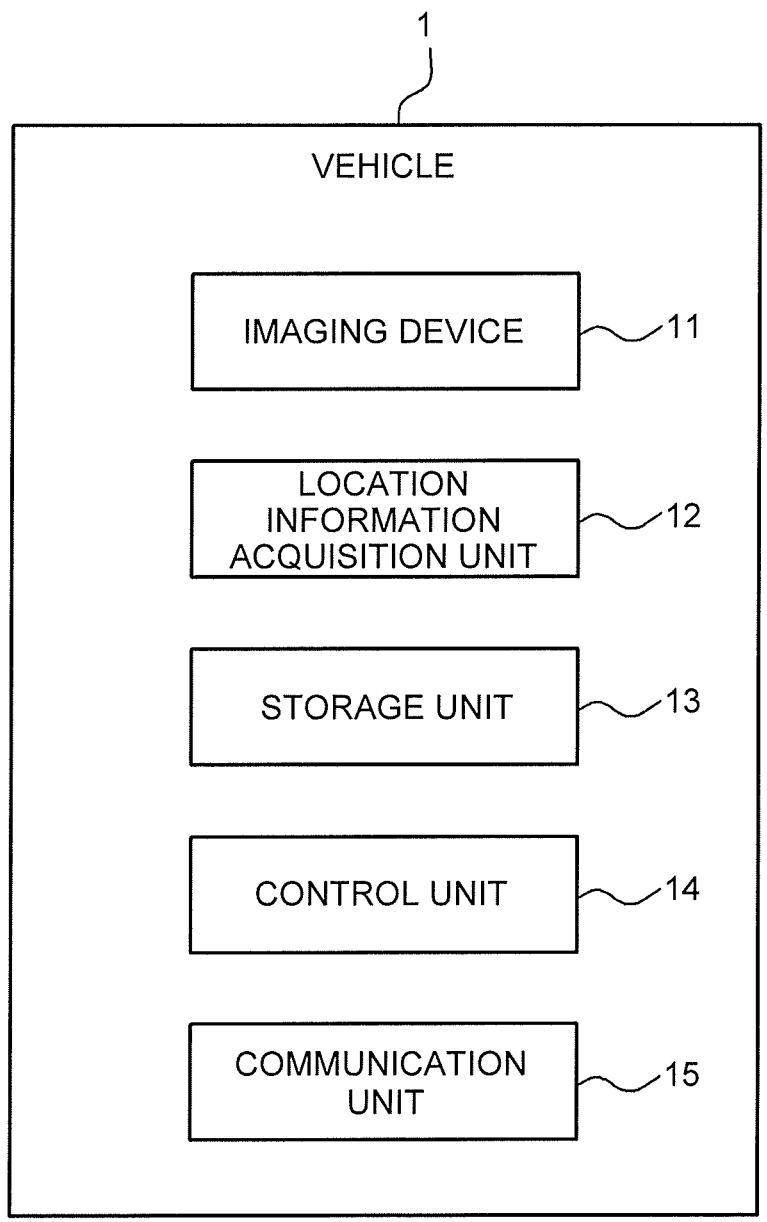
FIG. 2A is a functional block diagram of a vehicle in the embodiment.

As shown in FIG. 2A, the vehicle 1 includes the imaging device 11, a location information acquisition unit 12, a storage unit 13, a control unit 14, and a communication unit 15.

The imaging device 11 includes what is called an in-vehicle camera to image an image of the outside of the vehicle 1 (for example, a front area, a side area, a rear area, or the like). The imaging device 11 may generate a continuous video image of the outside of the vehicle 1 while the vehicle 1 travels or stops, and may record the generated video image on the storage unit 13. As an alternative example, any communication terminal, such as a smartphone, may function as the imaging device 11.

The location information acquisition unit 12 includes one or more receivers corresponding to any global positioning system. For example, the location information acquisition unit 12 may also include a global positioning system (GPS) receiver. The location information acquisition unit 12 detects location information indicating the location of the stopped or traveling vehicle 1. The location information acquisition unit 12 may further include an electronic compass to acquire information on the direction where the vehicle 1 faces.

The storage unit 13 is a device that records or stores various pieces of information. The storage unit 13 includes one or more memories. Although examples of the "memory" include a semiconductor memory, a magnetic memory, or an optical memory, the memory is not limited to these. The memory or memories included in the storage unit 13 may each function as a main storage, an auxiliary storage, or a cache memory, for example. The storage unit 13 stores any information related to operation of the vehicle 1. The storage unit 13 may store the information on the result of analysis and processing performed by the control unit 14. The storage unit 13 may store various pieces of information with regard to operation or control of the vehicle 1, such as vehicle control programs of the own vehicle.

The control unit 14 includes one or more processors. The "processor" may be a general-purpose processor or an exclusive processor dedicated for specific processing. For example, an electronic control unit (ECU) mounted on the vehicle 1 may function as the control unit 14. The control unit 14 controls the entire operation of the vehicle 1. The control unit 14 performs control of the imaging device 11, the location information acquisition unit 12, the storage unit 13, and the communication unit 15, and also performs all the control with regard to traveling or operation of the vehicle 1. For example, the control unit 14 can acquire images from the imaging device 11, and analyzes the images to detect objects. The control unit 14 may be configured as an information processing device. The information processing device may be mounted on the vehicle 1 as in the embodiment, or may be disposed in a center server or a crowd server outside the vehicle. When the information processing device is disposed outside the vehicle, an in-vehicle communication device (such as a data communication module (DCM)), communicable with the information processing device outside the vehicle, transmits the images received from the imaging device 11 to the information processing device outside the vehicle. The information processing device outside the vehicle includes a communication module connected to the network NW so as to receive the images through the communication module.

The communication unit 15 includes a communication module that performs communication between the vehicle 1 and the server device 2. The communication unit 15 may include a communication module that performs vehicle-to-vehicle communication between the vehicle 1 and other vehicles, without through the server device 2 as necessary. The communication unit 15 may include a communication module connected to a network, or a communication module in conformity with mobile object communication standards, such as 4th generation (4G) and 5th generation (5G) mobile object communication standards. For example, a device such as a DCM mounted on the vehicle 1 may function as the communication unit 15.

Figure 2B:
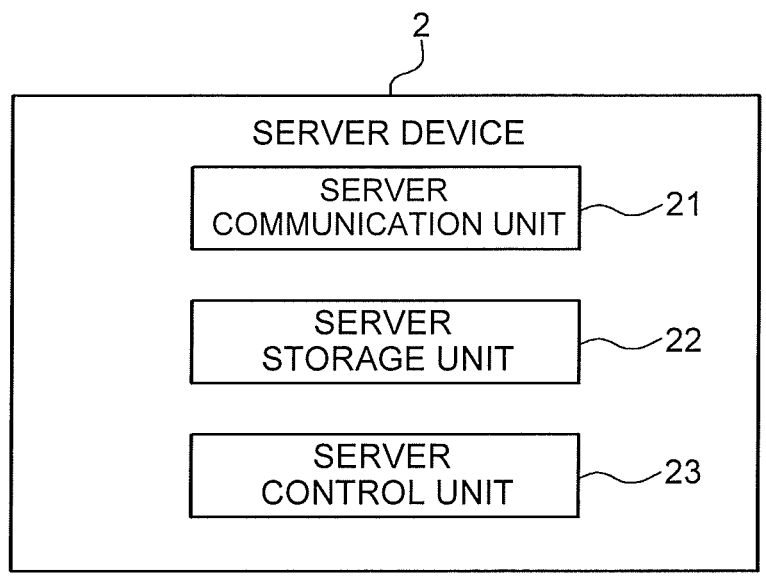
FIG. 2B is a functional block diagram of a server device in the embodiment.

As shown in FIG. 2B, the server device 2 includes a server communication unit 21, a server storage unit 22, and a server control unit 23.

The server communication unit 21 includes a communication module that performs communication between the server device 2 and the vehicle 1 or between the server device 2 and the user terminal 3. The server communication unit 21 may include a communication module connected to the network NW. The server communication unit 21 can acquires the information output from the vehicle 1, and also output information or an instruction to the vehicle 1.

The server storage unit 22 is a device that records and stores various pieces of information. The server storage unit 22 includes one or more memories. The memory or memories included in the server storage unit 22 may each function as a main storage, an auxiliary storage, or a cache memory, for example. The server storage unit 22 stores information output from the vehicle 1, for example. The server storage unit 22 may store a server control program or various programs relating to operation and control of the entire information processing system S.

The server control unit 23 includes one or more processors. The server control unit 23 performs control of the server communication unit 21 and the server storage unit 22, and also performs all the control with regard to the operation of the server device 2 and the entire information processing system S.

Figure 2C:
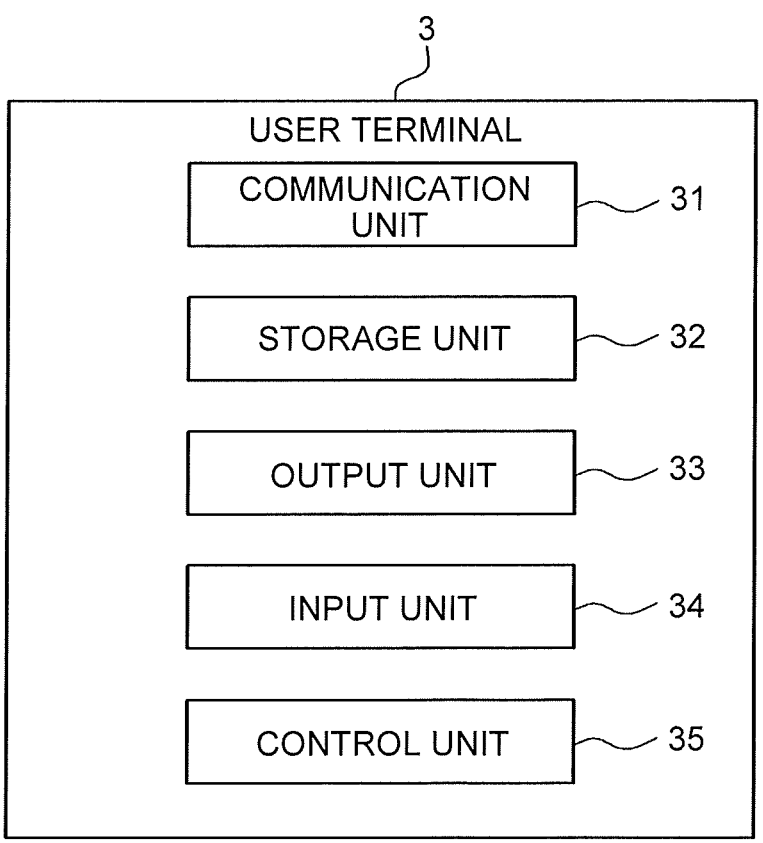
FIG. 2C is a functional block diagram of a user terminal in the embodiment.

As shown in FIG. 2C, the user terminal 3 includes a communication unit 31, a storage unit 32, an output unit 33, an input unit 34, and a control unit 35.

The communication unit 31 includes a communication module connected to the network. The communication unit 31 may include a communication module in conformity with mobile object communication standards, such as 4G and 5G mobile object communication standards.

The storage unit 32 is a device that records and stores various pieces of information. The storage unit 32 includes one or more memories. The memory or memories included in the storage unit 32 may each function as a main storage, an auxiliary storage, or a cache memory, for example. The storage unit 32 may store various programs with regard to operation or control of the entire user terminal 3.

The output unit 33 includes one or more output interfaces that output information and notify the user of the information. For example, the output interface included in the output unit 33 is a display that outputs information as a video image, or a speaker that outputs information by voice. However, the output interface is not limited to these.

The input unit 34 includes one or more input interfaces that detect a user input. Examples of the input interface included in the input unit 34 include a physical key, an electrostatic capacity key, a touchscreen provided integrally with the display of the output unit 33, or a microphone that receives voice input. However, the input interface is not limited to these.

The control unit 35 includes one or more processors. The control unit 35 performs all the control with regard to the operation of the entire user terminal 3.

The process executed by the information processing system S will be described below in detail. The vehicle 1 images a plurality of images with the imaging device 11 at prescribed intervals (for example, 30 frames per second, one frame per second, or the like). The vehicle 1 stores location information, regarding the vehicle 1 when the images are imaged, in association with image IDs.

The vehicle 1 detects the number of persons, and the number of persons who use rain gear among them, in each of the imaged images, and stores in the storage unit 13 both the numbers in association with the image IDs. The rain gear includes umbrellas, and raincoats, for example.

For example, as shown in FIG. 3, in an image R01 imaged at time t1 in a location (X1, Y1), the detected number of persons (corresponding to "number of persons" in FIG. 3) is three, and the number of those who use rain gear among them (corresponding to "number of rain gear users" in FIG. 3) is zero. The vehicle 1 calculates a rain gear usage rate using a subsequent equation:

Rain gear usage rate (%)=rain gear users/number of persons×100

With the above equation, the vehicle 1 calculates the rain gear usage rate in the image R01 as 0%.

The vehicle 1 determines the presence of a rainfall in accordance with the rain gear usage rate. The rainfall represents a phenomenon involving a fall of at least one of rain, snow, sleet, graupel, or hail.

The vehicle 1 determines there is a rainfall when the rain gear usage rate is equal to or more than a prescribed value. In the embodiment, the prescribed value is 25% in one example, though the prescribed value may take other values. When the rain gear usage rate is less than the prescribed value, the vehicle 1 determines there is no rainfall. For example, in the image R01 where the rain gear usage rate is 0%, the vehicle 1 determines that there is no rainfall.

The images R01 to R05 are stored in order of earlier imaging time. The vehicle 1 determines, for each of the image R02 and the image R03, the number of persons, the number of rain gear users, the rain gear usage rate, and the presence of rainfall, by the same method as used for the image R01. In order to avoid redundant description, description of the determination method for the image R02 and the image R03 is omitted. The determination result is as shown in FIG. 3.

Figure 4:
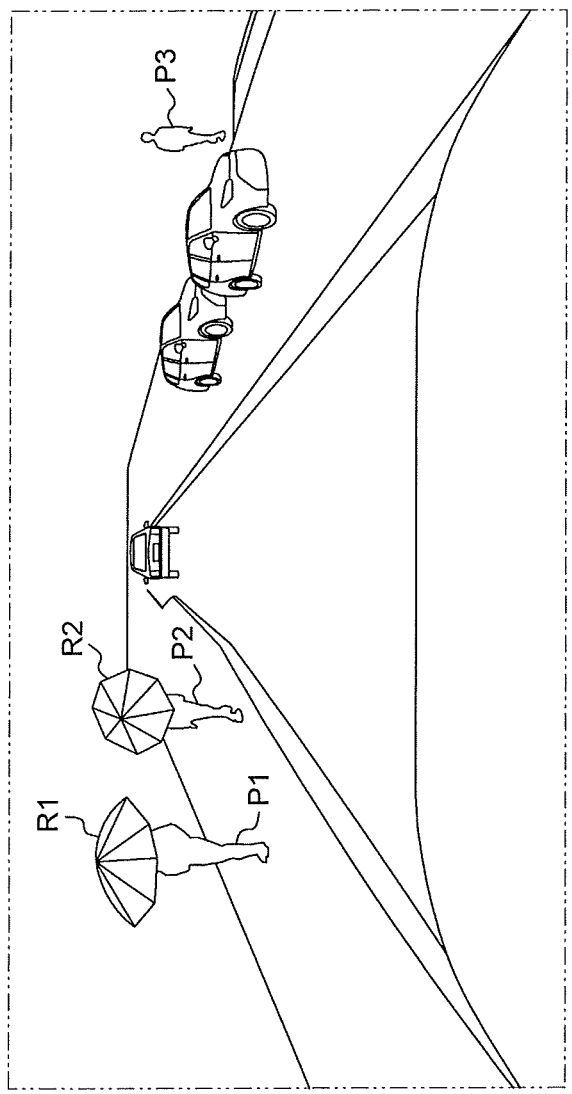
FIG. 4 shows an example of the imaged image.

FIG. 4 shows the image R04 imaged at time t4 in a location (X4, Y4). In the image R04, the vehicle 1 determines that the number of persons is three including P1 to P3. The vehicle 1 further detects that the person P1 uses rain gear R1, and the person P2 uses rain gear R2. Accordingly, the vehicle 1 determines that the number of rain gear users is two. Based on the determination result, the vehicle 1 determines that the rain gear usage rate is 66.7%. The vehicle 1 determines there is a rainfall since the rain gear usage rate is 25% or more. In order to avoid redundant description, description about the image R05 is omitted.

The vehicle 1 detects a change from a non-rainfall state to a rainfall state or a change from the rainfall state to the non-rainfall state. Hereinafter, in the embodiment, the vehicle 1 detects a change from the non-rainfall state to the rainfall state, for the sake of simplified description. In other embodiments, however, the information processing system S can execute the same process when the system S detects any one of the changes.

When detecting that the rain gear usage rate reaches 25% in the image R04, the vehicle 1 detects a change from the non-rainfall state to the rainfall state. When such a change is detected, the vehicle 1 outputs to the server device 2 a change notice notifying the presence of a change in association with location information regarding the vehicle 1 (more specifically location (X4, Y4)) when the change is detected, and the time when the change is detected. In the embodiment, the vehicle 1 may associate the rain gear usage rate, as well as the location information, with the change notice in one example.

There may be two or more vehicles 1. When detecting a change from the non-rainfall state to the rainfall state, the vehicles 1 output to the server device 2 change notices in association with the time, the location information, and the rain gear usage rate.

When the server device 2 acquires the change notices, the server device 2 stores the change notices in the server storage unit 22 as shown in FIG. 5. In the example shown in FIG. 5, the server device 2 stores change notices S01 to S03 corresponding to the images imaged at time t4, and stores corresponding time, location information, and rain gear usage rate in association with the change notices S01 to S03.

Figure 6A:
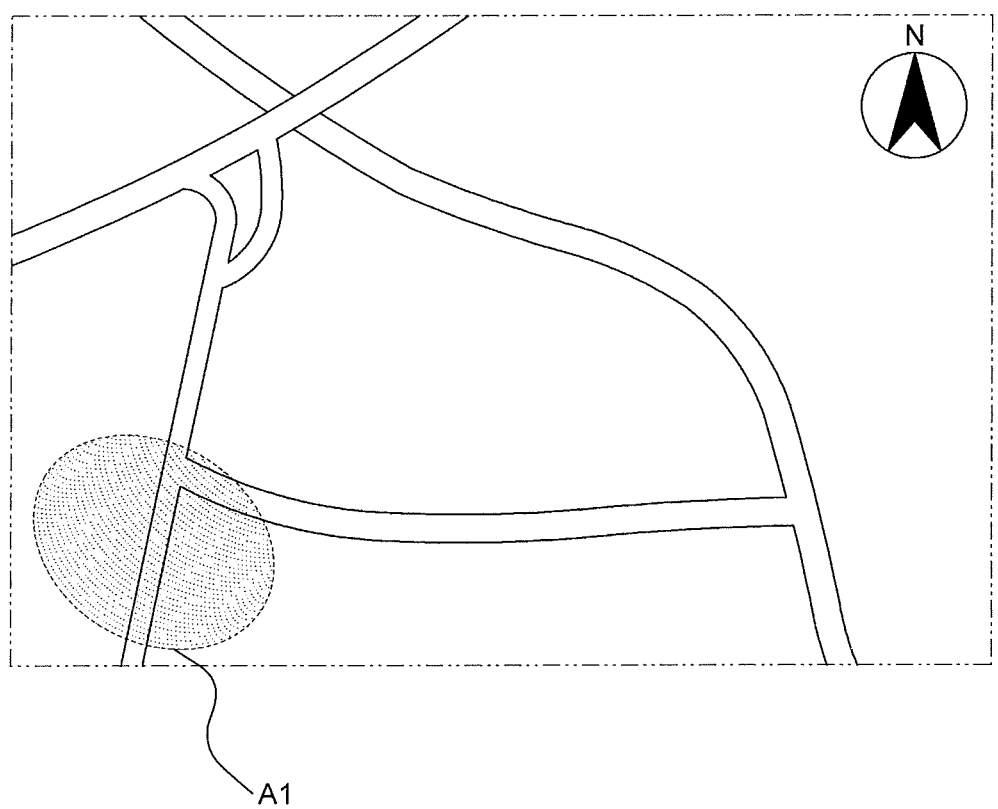
FIG. 6A shows an example of mapping.

A specific description is given of a process for specifying an area having a rainfall at time t4. The server device 2 extracts the information regarding the vehicles 1 at time t=t4 from the server storage unit 22. A plurality of location information pieces is extracted at the time. The server device 2 maps the extracted location information pieces on a map. The server device 2 approximates the mapped location information pieces by a simple closed curve, such as a circular curve or an elliptic curve, for example. At the time, the server device 2 can use any method, such as a geometric fitting. The server device 2 specifies an inside of the simple closed curve as an area with a rainfall. The periphery of the simple closed curve substantially matches with a boundary between an area with a rainfall and an area without a rainfall. The map after mapping is shown in FIG. 6A. The area with a rainfall is shown as an area A1. The server device 2 may output the map after mapping in response to a request from the vehicle 1 or the user terminal 3.

Figure 6B:
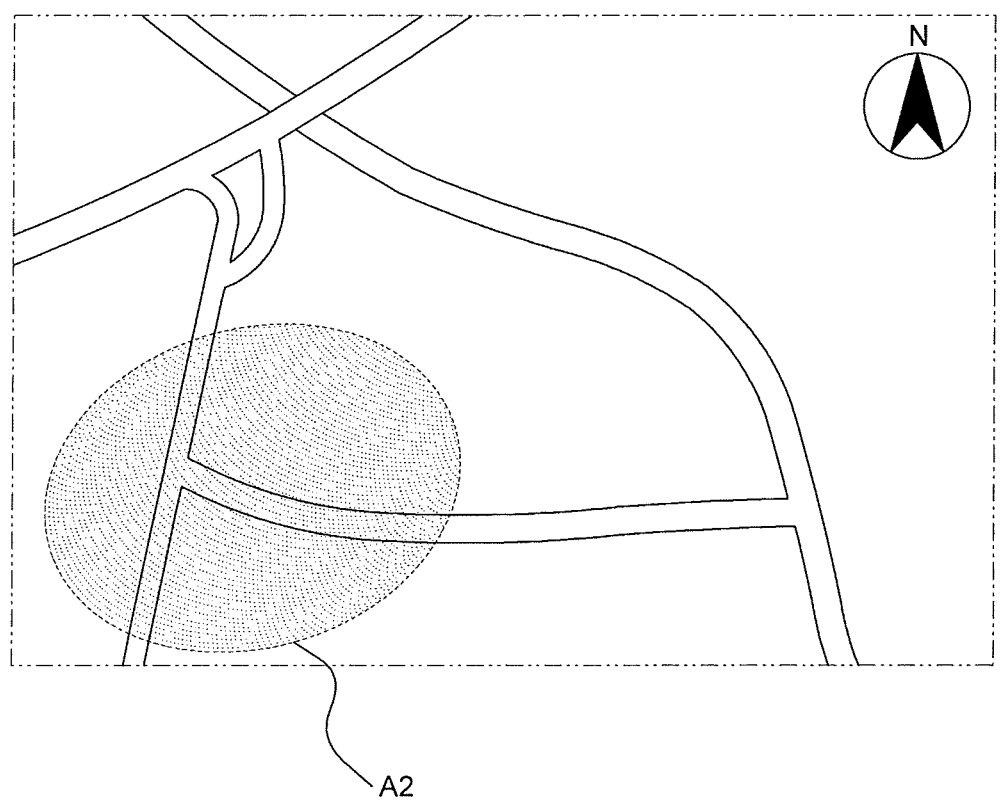
FIG. 6B shows another example of mapping.

After specifying the area A1 shown in FIG. 6A, the server device 2 may acquire the change notices from the vehicles 1 at prescribed intervals, and re-execute mapping relating to one specific time with use of the location information associated with the acquired change notices. The map after re-executed mapping is shown in FIG. 6B. The server device 2 specifies an area A2 by the same method used for determining the area A1.

Figure 6C:
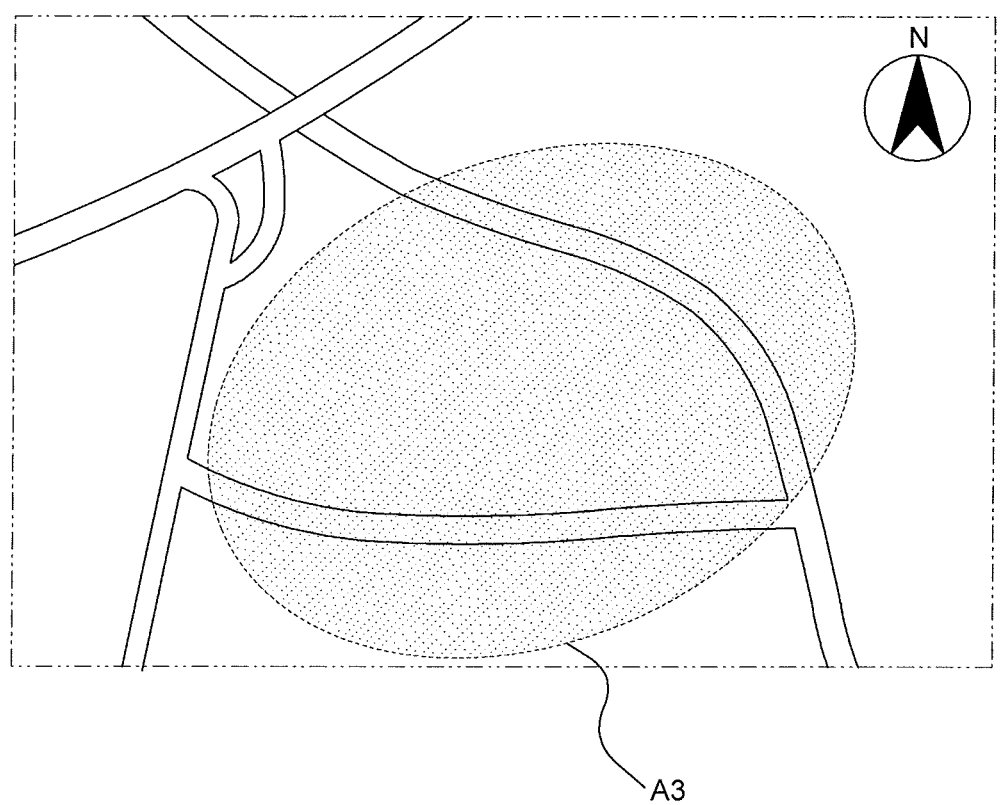
FIG. 6C shows an area where a change from a non-rainfall state to a rainfall state is predicted.

The server device 2 detects a past transition of the area identified to have a rainfall, and predicts an area having a change within a prescribed time in the future, based on the past transition. Specifically, the server device 2 compares the area A1 and the area A2, and determines that the area with a rainfall moves substantially northeastward and that the size of the area enlarges. The server device 2 estimates that the area with a rainfall moves in the same direction and expands at the same ratio as before. Accordingly, as shown in FIG. 6C, the server device 2 specifies an area A3 that is predicted to have a rainfall within a prescribed time in the future. The server device 2 can predict an area that has a change from the non-rainfall state to the rainfall state and a change from the rainfall state to the non-rainfall state within a prescribed time in the future by comparing the area A2 and the area A3 and extracting a difference therebetween.

The server device 2 acquires location information regarding the respective user terminals 3, and detects one or more user terminals 3 that are present in the area where a change in state is predicted. The server device 2 extracts from the server storage unit 22 information on facilities present in a prescribed distance (for example, 50 meters) from the detected location. Examples of the facility information include the location and name of facilities. Examples of the facilities include buildings that allow access of users, such as eating places (such as cafes, and restaurants), retail stores (such as convenience stores, and supermarkets), and government offices.

The server device 2 notifies a potential change from the non-rainfall state to the rainfall state within a prescribed time in the future to the detected user terminals 3, and al so notifies the extracted facility information. Additionally, the server device 2 may estimate and notify the time until the change occurs.

The user terminals 3 display the acquired content of notification on the output unit 33. The users without rain gear can avoid getting wet in the rain by visually recognizing the displayed facility information and visiting a facility corresponding to the facility information.

FIG. 7 is a sequence diagram of a method of information processing executed by the information processing system S of the embodiment at any time point.

Step S1: the vehicle 1 images a plurality of images.

Step S2: the vehicle 1 analyzes the images, and detects a change from the non-rainfall state to the rainfall state.

Step S3: when detecting the change in step S2 (Yes in step S2), the vehicle 1 outputs to the server device 2 a change notice in association with location information regarding the vehicle 1 when the change is detected.

Step S4: the server device 2 maps on a map the location corresponding to the location information acquired from the vehicle 1.

Step S5: the server device 2 executes mapping at prescribed intervals, and detects a past transition of an area identified to have a rainfall.

Step S6: the server device 2 predicts an area where a change occurs within a prescribed time in the future, based on the detected transition.

Step S7: the server device 2 notifies, to the user terminals 3 present in the area where the change is predicted to occur within the prescribed time in the future, information on facilities that are in a prescribed distance from the user terminals.

Step S8: the user terminals 3 display the content of notification acquired from the server device 2.

As stated above, according to the embodiment, the vehicle 1 analyzes the images imaged by the imaging device 11, and detects a change between the rainfall state and the non-rainfall state. With the configuration, the vehicle 1 can detect what kind of actions that persons such as pedestrians take for the change from the non-rainfall state to the rainfall state. Hence, the vehicle 1 can detect an actual change from the non-rainfall state to the rainfall state.

According to the embodiment, the images analyzed in order to detect a change in state are imaged by the vehicle 1. Since the vehicle 1 is a mobile object, the vehicle 1 can comprehensively detect the change in state on various roads.

According to the embodiment, the vehicle 1 detects one or more persons and rain gear used by the person or persons in the images, and determines that the non-rainfall state changes to the rainfall state when a ratio of the number of rain gear users to the detected number of persons reaches a prescribed value. With the configuration, the vehicle 1 detects a change from the non-rainfall state to the rainfall state based on a characteristic behavior (using rain gear in the embodiment) of the persons for the rainfall phenomenon. This makes it possible to achieve further enhancement of the accuracy for detecting the change.

According to the present disclosure, the server device 2 acquires the location information from the vehicles 1, maps the locations corresponding to the location information on a map, and outputs the map after mapping. With the configuration, the server device 2 can determine in which location rain falls at present. This makes it possible to provide more sufficient weather information. The server device 2 also enables the users who visually recognize the weather information to aware that the rain gear is necessary when visiting an area with a rainfall. Furthermore, when government and municipal offices or local government offices provide the weather information to tourists, they can reduce the tourists annoyed with weather. Therefore, it is possible to provide enjoyable sightseeing experience to the tourists.

According to the embodiment, the server device 2 acquires location information from the information processing devices to detect a past transition of the area specified to have a rainfall, and predicts an area having a change within a prescribed time in the future based on the past transition. The server device 2 also notifies that the change occurs within the prescribed time in the future to the user terminals present in the area where the change is predicted to occur within the prescribed time in the future. Since the server device 2 can provide more sufficient weather report in the configuration, it is possible to reduce that the user, who is scheduled to visit the area that is predicted to have a change within a prescribed time in the future, is annoyed by weather.

According to the present disclosure, the server device 2 further notifies, to the user terminals present in the area where the change is predicted to occur within the prescribed time in the future, information on facilities that are present in a prescribed distance from the user terminals. With the configuration, the server device 2 can support the users without rain gear so as to be sheltered from the rain. Therefore, it becomes possible to further enhance the convenience.

While the present disclosure has been described based on drawings and embodiments, it is to be understood that those person skilled in the art can easily make various transformations and corrections based on the present disclosure. Therefore, it is to be noted that these transformations and corrections are intended to be embraced in the range of the present disclosure. For example, the functions, or the like, included in each means, step, or the like, can be rearranged without causing logical inconsistency, and a plurality of means, steps, or the like, can be integrated into unity or can be divided.

For example, when the rain gear usage rate increases by a prescribed value or more within a prescribed time in the future (for example, 90% or more in five seconds), the vehicle 1 may determine occurrence of a guerrilla rainstorm, and may notify a determination result to the server device 2. In mapping, the server device 2 may display an area determined as the area where the guerrilla rainstorm occurs in a manner distinguishable from other areas. The distinguishable display may include display in different color.

According to the embodiment, the server device 2 approximates the mapped location information pieces with a simple closed curve, and specifies the inside of the simple closed curve as an area with a rainfall. In another embodiment, the area with a rainfall may be specified by different methods. More specifically, the vehicle 1 further transmits to the server device 2 a moving direction of the vehicle 1 and the content of a change (i.e., one of a change from the non-rainfall state to the rainfall state and a change from the rainfall state to the non-rainfall state) in association with a change notice. The server device 2 approximates the mapped location information pieces by a simple closed curve by the method described in the embodiment stated before. The server device 2 may determine which represents the area with a rainfall, the inside or the outside of the simple closed curve, with use of the moving direction and the content of the change acquired from the vehicle 1.

It is also possible to establish the configuration where any vehicle or any server device function as the vehicle 1 or the server device 2 according to the above embodiment, respectively. Specifically, a program describing the content of a process that implements each function of the vehicle 1 or the server device 2 according to an embodiment is stored in a memory of the any vehicle or server device, and the program is read and executed by the processor of the any vehicle or server device. Therefore, the disclosure according to this embodiment may be implemented as a program executable by the processor.

What is claimed is:

1. An information processing system comprising:
a server device; and
an information processing device communicable with the server device, wherein
the information processing device is configured to
acquire a plurality of images imaged by an imaging device included in a vehicle,
determine a rain gear usage rate from the acquired plurality of images,
output to the server device, when a determination is made that the rain gear usage rate increases by a prescribed value within a prescribed time interval, a notification that indicates an increase in intensity of rainfall, and
output to the server device, when detecting a change from a non-rainfall state to a rainfall state, or a change from the rainfall state to the non-rainfall state based on the acquired plurality of images, location information regarding the vehicle when the change is detected.

2. The information processing system according to claim 1, wherein the information processing device is configured to
detect, in the images, a number of persons and rain gear used by one or more persons in the detected number of persons, the rain gear usage rate being determined from a ratio of a number of rain gear users to the detected number of persons, and
determine that the non-rainfall state changes to the rainfall state when the rain gear usage rate reaches the prescribed value.

3. The information processing system according to claim 1, wherein the server device is configured to
acquire the location information from the information processing device,
map locations corresponding to the location information on a map, and
output the map after mapping.

4. The information processing system according to claim 1, wherein the server device is configured to
acquire the location information from the information processing device,
detect a past transition of an area having a rainfall, the area being specified based on the location information, and
predict, based on the past transition, an area where the change occurs within a prescribed future time.

5. The information processing system according to claim 4, wherein the server device is configured to notify occurrence of the change within the prescribed future time to user terminals that are present in the area where the change is predicted to occur within the prescribed future time.

6. The information processing system according to claim 5, wherein the server device is further configured to notify, to the user terminals that are present in the area where the change is predicted to occur within the prescribed future time, information on facilities that are present in a prescribed distance from the user terminals.

7. A method of information processing executed in an information processing system, including a server device, and an information processing device communicable with the server device, the method comprising steps, executed by the information processing device, of:
acquiring a plurality of images imaged by an imaging device included in a vehicle;
determine a rain gear usage rate from the acquired plurality of images;
outputting to the server device, when a determination is made that the rain gear usage rate increases by a prescribed value within a prescribed time interval, a notification that indicates an increase in intensity of rainfall; and
outputting to the server device, when detecting a change from a non-rainfall state to a rainfall state, or a change from the rainfall state to the non-rainfall state based on the acquired plurality of images, location information regarding the vehicle when the change is detected.

8. A non-transitory computer readable medium having instructions stored therein, which when executed by a processor in an information processing device communicable with a server device in an information processing system, causes the processor to execute the steps of:
acquiring a plurality of images imaged by an imaging device included in a vehicle;

determine a rain gear usage rate from the acquired plurality of images;
outputting to the server device, when a determination is made that the rain gear usage rate increases by a prescribed value within a prescribed time interval, a notification that indicates an increase in intensity of rainfall; and
outputting to the server device, when detecting a change from a non-rainfall state to a rainfall state, or a change from the rainfall state to the non-rainfall state based on the acquired plurality of images, location information regarding the vehicle when the change is detected.

\* \* \* \* \*